Patented Feb. 8, 1927.

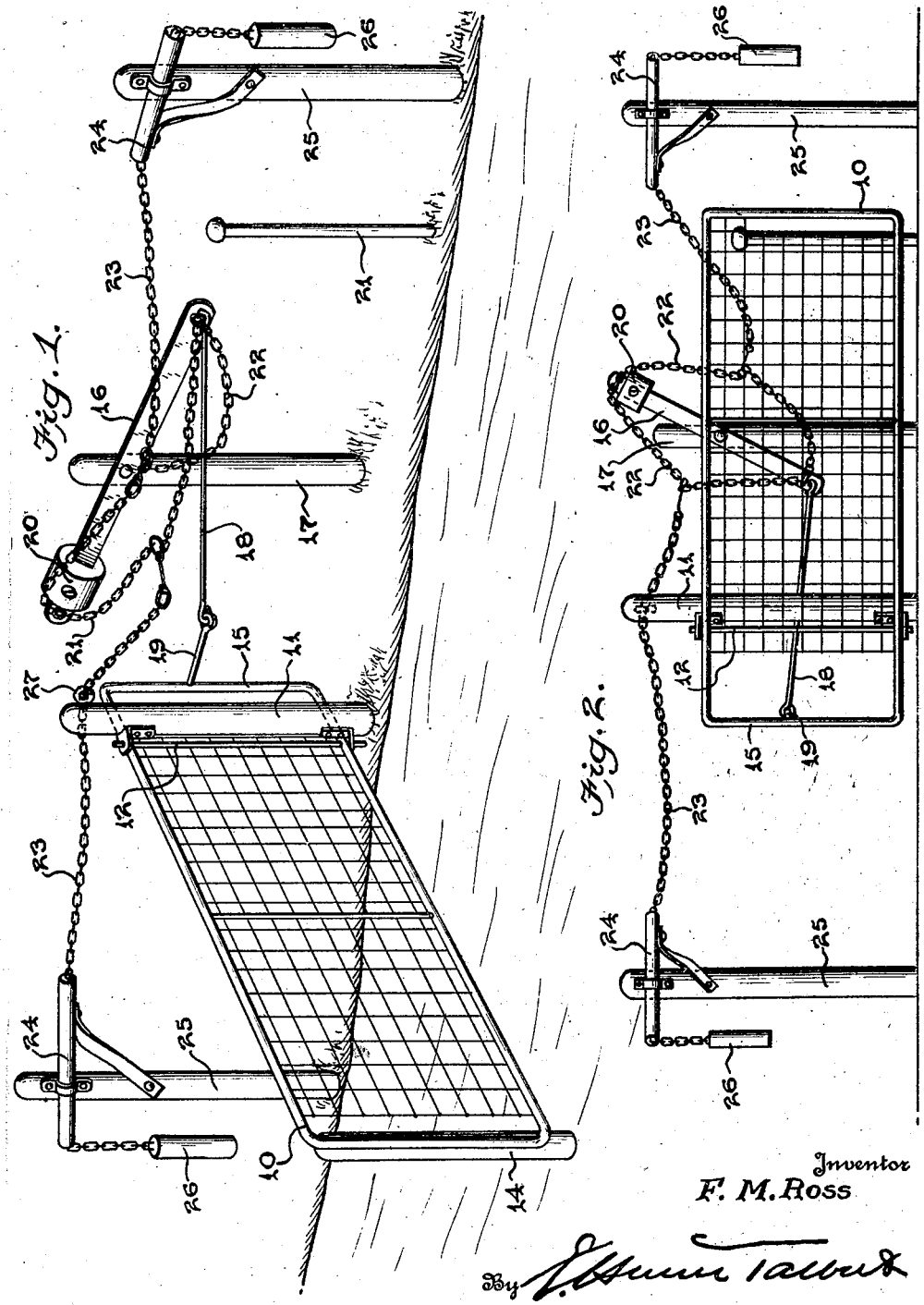

1,617,135

UNITED STATES PATENT OFFICE.

FRANK M. ROSS, OF BLACKBURN, MISSOURI.

FARM GATE.

Application filed April 9, 1926. Serial No. 100,887.

The object of the invention is to provide a gate construction in which the gate opening and closing movements may be effected from a remote point as by the occupant of a vehicle; to provide a construction in which the actuating element is merely started by the manual means and serves to continue the movement beyond a certain point; and to provide an adjustment whereby the pull necessary to effect movement may be varied and thereby the rate of movement of the gate in opening and closing operations regulated.

With this object in view, the invention consists in a construction and combination of parts of which a preferred embodiment is illustrated in the accompanying drawings, wherein:

Figure 1 is a perspective view illustrating the invention.

Figure 2 is a detail sectional view on the plane indicated by the line 2—2 of Figure 1.

The gate 10 is mounted for swinging movement from its closed to its open position and vice versa, being carried by a post 11 to which it is secured by means of a hinge pin 12. The opening movement is preferably effected inwardly and when closed, the free or outer end abuts a gate post 14. Provided with a frame extension 15 to close on the opposite side of the post 11 from the gate proper, the gate is connected with an operating means consisting of a lever 16 pivotally mounted at an intermediate point on the post 17 and terminally provided with a link 18 connected with the frame extension 15 as by an arm 19, the latter being provided so that, when the gate is open, the link may be kept free of the post 11.

The lever 16 carries at its remote end a weight 20 adjustable along the lever, the weight being at the upper end of the lever and the link connection at the lower end, so that when the lever is rocked, opening movement is imparted to the gate, if it be closed, and when the weight shall have passed the vertical plane of the pivot of the lever, it will fall on the other side and thus continue the opening movement until the gate shall have been brought into contact with the abutment post 21. The remote ends of the lever are connected by chains 22 and the length of these exceeds the length of the lever, pull chains 23 being connected with these chains at intermediate points and extending through guides 24 carried by posts 25, being terminally provided with handles 26 for hand operation.

Since the post 17 is disposed on one side of the gate, the lever actuating means disposed on the opposite side of the gate has its chain 23 extending through a guide eye 27 mounted on the post 11 to preclude interference with the gate in its opening and closing movements.

The provision of the chains 22 of greater length than the lever and terminally connected with the latter, provides for a pull at either end of the lever, depending on the position of the latter, and thus if the gate be open, either of the actuating means may be employed to rock the lever and, therefore, effect closing movement of the gate, or to effect opening movement if the gate be closed. Since the weight 20 is adjustable along the lever, its setting with reference to the pivot point of the lever determines the force necessary to be applied to the chains 23, the nearer the center the less the force necessary, and consequently the slower the movement of the gate in opening or closing. Conversely the adjustment of the weight near the outer extremity of the lever will effect fast opening and closing movement but at the same time call for a greater pulling force on the chains 23, and these being guided through the slides or guides 24, beyond which they are provided with the pull handles, may be readily actuated from the interior of the vehicle.

The invention having been described, what is claimed as new and useful is:

1. A gate mounted for swinging movement, an actuating means therefor consisting of a lever pivotally mounted at an intermediate point and having one terminal operatively connected to the gate and the other terminal provided with a weight, means for rocking the lever against the gravital force of the weight, said means comprising flexible members having terminal connections with the extremities of the lever and being of a length exceeding the length of the lever, and flexible pull members connected to the first said flexible members at intermediate points in the length of the latter.

2. A gate mounted for swinging movement, an actuating means therefor consisting of a lever pivotally mounted at an intermediate point and having one terminal operatively connected to the gate and the other terminal provided with a weight, means for rocking the lever against the gravital force of the weight, said means comprising chains having terminal connections with the extremities of the lever and being of a length exceeding the length of the lever, and pull chains provided with guides, said pull chains being connected to the first said chains at intermediate points in the length of the latter, said weight being adjustable toward and away from the pivot point of the lever.

In testimony whereof he affixes his signature.

FRANK M. ROSS.